(12) United States Patent
Seck et al.

(10) Patent No.: US 12,554,712 B2
(45) Date of Patent: Feb. 17, 2026

(54) SYSTEMS AND METHODS FOR QUERY OPTIMIZATION

(71) Applicant: Capital One Services, LLC, McLean, VA (US)

(72) Inventors: Mohamed Seck, Aubrey, TX (US);
Pavlo Savchuk, Dublin, CA (US);
Nikitha Kondapally, Frisco, TX (US);
Chris Gallucci, Plano, TX (US);
Prerna Kandhari, McKinney, TX (US); Anand Annamalai, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 19/024,488

(22) Filed: Jan. 16, 2025

(65) Prior Publication Data
US 2025/0209071 A1    Jun. 26, 2025

Related U.S. Application Data

(63) Continuation of application No. 18/394,493, filed on Dec. 22, 2023, now Pat. No. 12,222,938.

(51) Int. Cl.
| | | |
|---|---|---|
| G06F 16/00 | (2019.01) | |
| G06F 11/34 | (2006.01) | |
| G06F 16/242 | (2019.01) | |
| G06F 16/2453 | (2019.01) | |
| G06F 16/2455 | (2019.01) | |

(52) U.S. Cl.
CPC .... *G06F 16/24534* (2019.01); *G06F 11/3409* (2013.01); *G06F 16/243* (2019.01); *G06F 16/2453* (2019.01); *G06F 16/2455* (2019.01)

(58) Field of Classification Search
CPC ................................................ G06F 16/2453
See application file for complete search history.

(56) References Cited

U.S. PATENT DOCUMENTS

| | | |
|---|---|---|
| 9,516,053 B1 | 12/2016 | Muddu et al. |
| 10,437,843 B2 | 10/2019 | Nguyen et al. |
| 11,386,086 B2 | 7/2022 | Purcell et al. |
| 11,500,871 B1 | 11/2022 | Kulkarni et al. |
| 2020/0285642 A1 | 9/2020 | Bei et al. |

(Continued)

*Primary Examiner* — Ajith Jacob
(74) *Attorney, Agent, or Firm* — Bookoff McAndrews, PLLC

(57) ABSTRACT

A method for query optimization may include capturing a proposed database query input into a user interface. The method may further include providing the proposed database query to a machine-learning model. The machine-learning model may have been trained, using one or more gathered and/or simulated sets of query execution overhead data and one or more gathered and/or simulated sets of database queries, to determine a potential execution overhead of a database query and output a query execution score. The method may further include outputting, by the machine-learning model, the query execution score based on the proposed database query. The method may further include determining that the query execution score exceeds a query execution score threshold. The method may further include triggering a corrective action based on the query execution score exceeding the query execution score threshold.

20 Claims, 7 Drawing Sheets

(56) References Cited

U.S. PATENT DOCUMENTS

| | | |
|---|---|---|
| 2021/0192395 A1 | 6/2021 | Sainani et al. |
| 2022/0004553 A1 | 1/2022 | Corvinelli et al. |
| 2023/0306061 A1* | 9/2023 | Bui .................... G06F 16/9032 |

\* cited by examiner

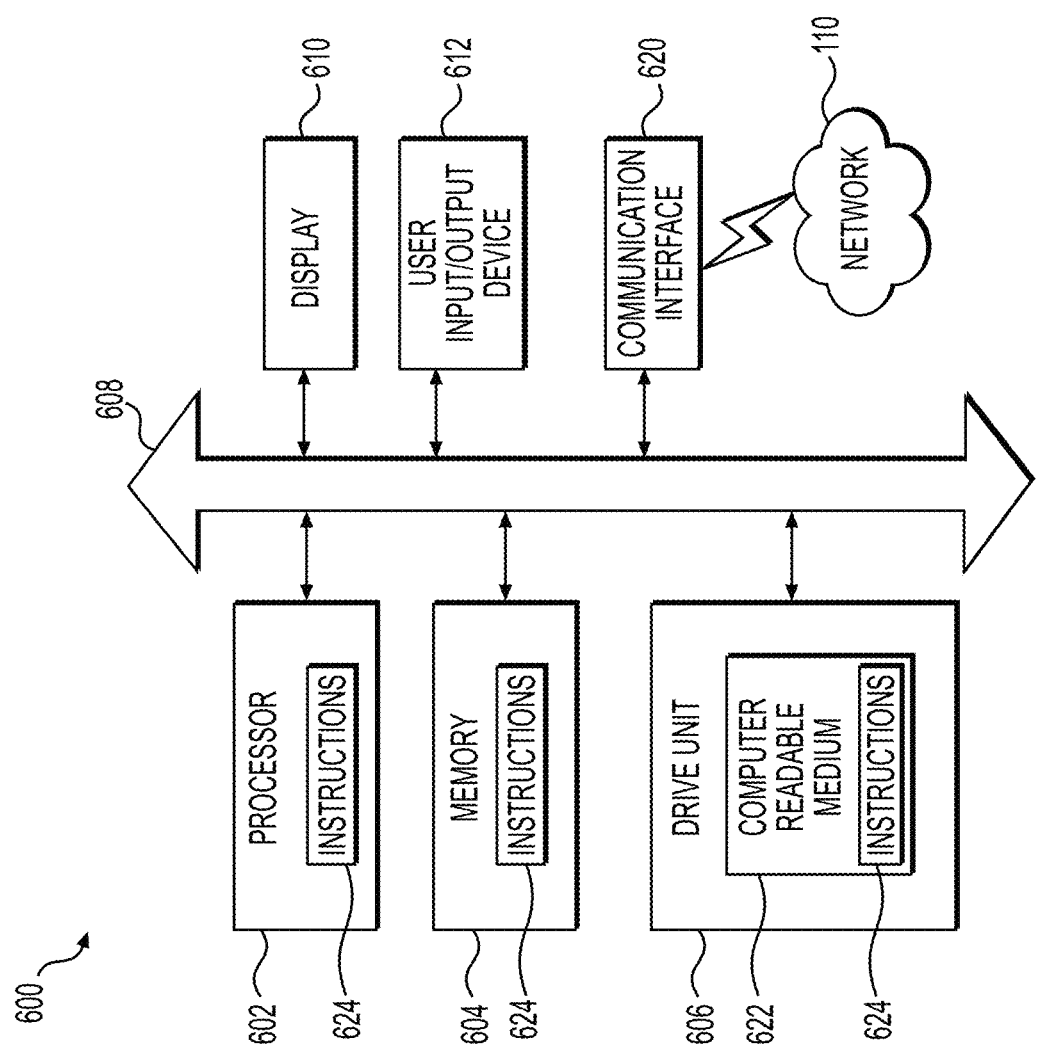

SYSTEMS AND METHODS FOR QUERY OPTIMIZATION

CROSS-REFERENCE TO RELATED APPLICATION(S)

This patent application is a continuation of and claims the benefit of priority to U.S. Nonprovisional patent application Ser. No. 18/394,493, filed on Dec. 22, 2023, the entirety of which is incorporated by reference herein.

TECHNICAL FIELD

Various embodiments of this disclosure relate generally to machine-learning-based techniques for securely determining associations between database queries and query execution overhead data, and, more particularly, to systems and methods for query optimization.

BACKGROUND

For each query that is written and run on a database system by a user, the resulting overhead of the execution of that query draws upon the computing resources of the system. Users may each possess their own experience level or style in writing queries, which may result in instances where a query may use more computing resources than necessary. In some cases, there may be a real-time cost associated with the draw on the computing resources used to run the query (e.g., the query overhead). Additionally, the computing resources used to run a particular query may be tied up, resulting in a decreased availability of those resources for another query or computing process. Many other variables may affect the availability of the computing resources of a system, such as time of day, number of users drawing upon the system, administrator policies, and the like. Users themselves may not be capable of generating an optimal query that takes into consideration a wide array of variable factors.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for query optimization.

In one aspect, an exemplary embodiment of a method for query optimization may include capturing, by one or more processors, a proposed database query input into a user interface. The method may further include providing, by the one or more processors, the proposed database query to a machine-learning model. The machine-learning model may have been trained, using one or more gathered and/or simulated sets of query execution overhead data and one or more gathered and/or simulated sets of database queries, to determine a potential execution overhead of a database query and output a query execution score. The method may further include outputting, by the machine-learning model, the query execution score based on the proposed database query. The method may further include determining, by the one or more processors, that the query execution score exceeds a query execution score threshold. The method may further include triggering, by the one or more processors, a corrective action based on the query execution score exceeding the query execution score threshold.

In another aspect, an exemplary embodiment of a method for query optimization may include providing, by one or more processors, a proposed database query to a machine-learning model. The machine-learning model may have been trained, using one or more gathered and/or simulated sets of query execution overhead data and one or more gathered and/or simulated sets of database queries, to determine a potential execution overhead of a database query and output a query execution score. The method may further include outputting, by the machine-learning model, the query execution score based on the proposed database query. The method may further include determining, by the one or more processors, that the query execution score exceeds a query execution score threshold. The method may further include identifying, by a natural language processor, one or more of a database update command or a database information request of the proposed database query. The method may further include generating, by the natural language processor, an optimized database query including the one or more of the database update command and the database information request.

In a further aspect, an exemplary embodiment of a system for query optimization may include a memory storing instructions and a machine-learning model. The machine-learning model may have been trained to find associations between one or more gathered and/or simulated sets of query execution overhead data and one or more gathered and/or simulated sets of database queries to determine a potential execution overhead of a database query and output a query execution score. The system may further include a processor operatively connected to the memory and configured to execute the instructions to perform operations. The operations may include capturing, by one or more processors, a proposed database query input into a user interface. The operations may further include providing, by the one or more processors, the proposed database query to the machine-learning model. The operations may further include outputting, by the machine-learning model, the query execution score based on the proposed database query. The operations may further include determining, by the one or more processors, that the query execution score exceeds a query execution score threshold. The operations may further include triggering, by the one or more processors, a corrective action based on the query execution score exceeding the query execution score threshold.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 6 depicts an example of a computing device, according to one or more embodiments.

DETAILED DESCRIPTION OF EMBODIMENTS

Figure 1:
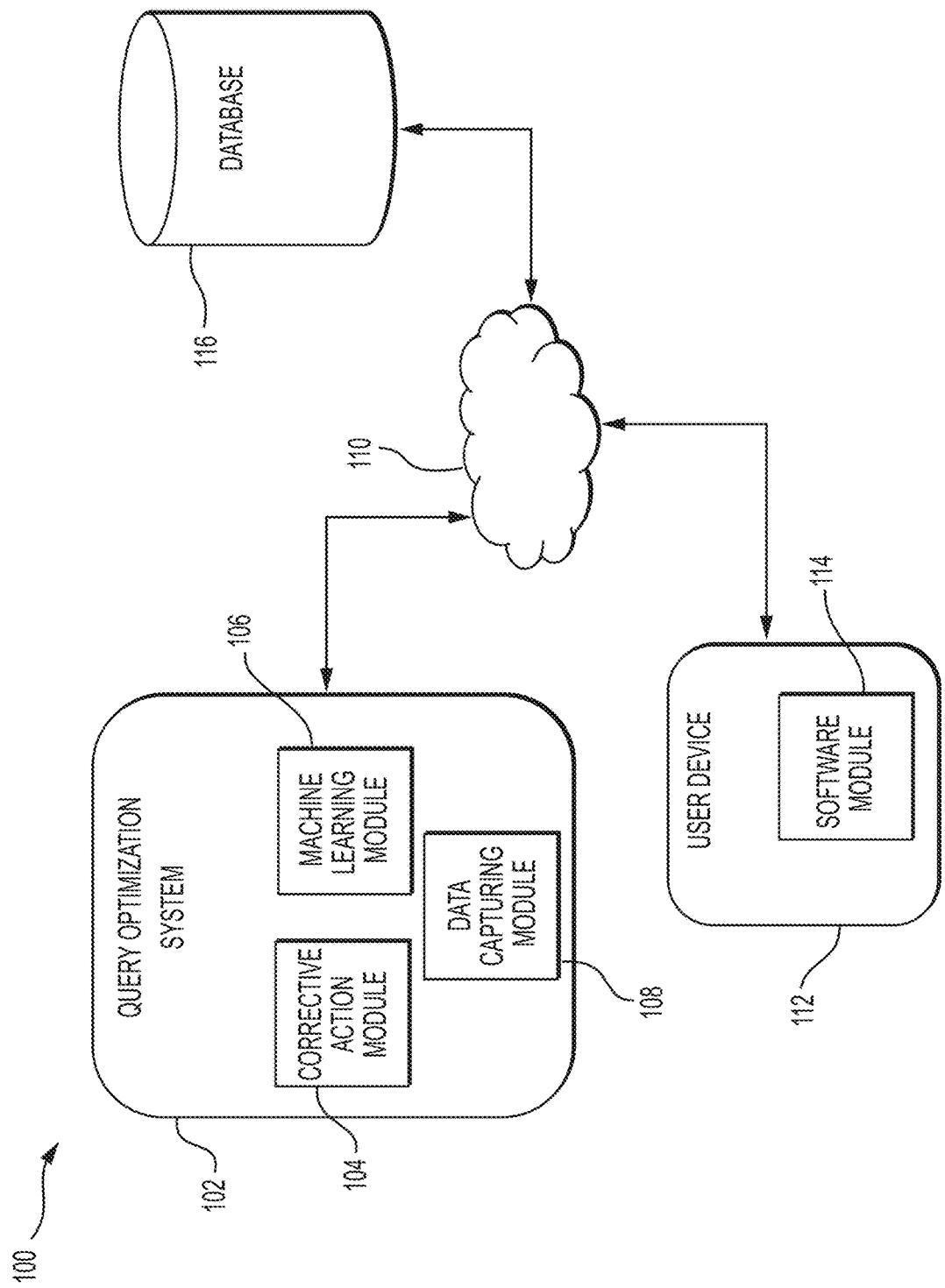
FIG. 1 depicts an exemplary environment for a query optimization system, according to one or more embodiments.

Users may have various experience levels in writing queries. Further, many other variables may impact the availability or efficient use of computing resources. A user may be unaware of the associated costs (e.g., real monetary cost and/or tying-up of resources) that come with the data retention and querying of that data when running a "bad" query (e.g., a long-running query and/or resource-intensive query). Therefore, so-called "bad," or non-optimal, queries have the potential to create platform instability which may ultimately result in increasing associated costs for the enterprise. An increase in non-optimal queries may occur as a result of organic user growth and lack of user training, as users may expect to solve use cases outside of the original design purpose of a database system.

Accordingly, introducing an analyzer system (e.g., a query optimization system) may allow users, or the enterprise system, to test the user's queries, dashboards, alerts, lookups, and the like, before introducing the same into a live environment. Each query may be rated, scored, or assigned a "like/dislike," or the like. The score may then be used to qualify the query for access to the live environment. Machine-learning techniques may be utilized to identify patterns of non-optimal queries and/or practices. Machine-learning techniques may also be utilized to record, escalate for training, or intervene in cases of non-optimal queries and/or practices.

Along with running non-optimal queries, users may be tempted to run queries upon a database system for use cases that would be better served by the use of other platforms available to the enterprise. A lack of automated guidance may result in a failure to assess the user's need to draw upon the resources of the database system as a best fit for their use case. Current platform monitoring may be reactive, therefore giving users the ability to introduce stability risks into the environment. Even for an enterprise with different tiered levels of access to data for each group of users, all tiered levels may still be allowed access to the same resources and data retention.

Therefore, interventive measures may be taken, according to the described system and methods, to (1) identify the best (e.g., preferred, most efficient, or the like) tool kit for each user's use case, (2) use machine-learning to identify non-optimal queries, (3) user machine-learning to identify repeat "offenders" (e.g., user's that generate non-optimal queries with a level of frequency), (4) user machine-learning to generate optimized queries or best practices, (5) allow a query to run for a predetermined period of time before it is converted to a summary index, and the like. According to certain aspects of the disclosure, systems and methods are disclosed for query optimization based on finding associations in database queries and query execution overhead data.

As will be discussed in more detail below, in various embodiments, systems and methods are described for using machine-learning to determine a potential execution overhead of a proposed database query. By training a machine-learning model (e.g., via supervised or semi-supervised learning), to learn associations between database queries (e.g., an update command, information request, and the like) and execution overhead data, the trained machine-learning model may be usable to determine a potential execution overhead of a proposed database query. The machine-learning model may output a query execution score. Based on the query execution score (e.g., a value associated with the anticipated draw upon computing resources that takes multiple factors into account), the system may trigger a corrective action (e.g., an intervention) that prevents an unnecessary draw upon computing resources.

Reference to any particular activity is provided in this disclosure only for convenience and not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Relative terms, such as, "substantially," "approximately," and "generally," are used to indicate a possible variation of ±10% of a stated or understood value.

It will also be understood that, although the terms first, second, third, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Terms like "provider," "merchant," "vendor," or the like generally encompass an entity or person involved in providing, selling, and/or renting items to persons such as a seller, dealer, renter, merchant, vendor, or the like, as well as an agent or intermediary of such an entity or person. An "item" generally encompasses a good, service, or the like having ownership or other rights that may be transferred. As used herein, terms like "user" or "customer" generally encompasses any person or entity that may desire information, resolution of an issue, purchase of a product, or engage in any other type of interaction with a provider. The term "browser extension" may be used interchangeably with other terms like "program," "electronic application," or the like, and generally encompasses software that is configured to interact with, modify, override, supplement, or operate in conjunction with other software. As used herein, terms such as "guidance" or the like generally encompass one or more recommendations.

As used herein, a "machine-learning model" generally encompasses instructions, data, and/or a model configured to receive input, and apply one or more of a weight, bias, classification, or analysis on the input to generate an output. The output may include, for example, a classification of the input, an analysis based on the input, a design, process, prediction, or recommendation associated with the input, or any other suitable type of output. A machine-learning model is generally trained using training data, e.g., experiential data and/or samples of input data, which are fed into the model in order to establish, tune, or modify one or more aspects of the model, e.g., the weights, biases, criteria for forming classifications or clusters, or the like. Aspects of a machine-learning model may operate on an input linearly, in parallel, via a network (e.g., a neural network), or via any suitable configuration.

The execution of the machine-learning model may include deployment of one or more machine-learning techniques, such as linear regression, logistical regression, random forest, gradient boosted machine (GBM), deep learning, and/or a deep neural network. Supervised and/or unsupervised training may be employed. For example, supervised learning may include providing training data and labels corresponding to the training data, e.g., as ground truth. Unsupervised approaches may include clustering, classification or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc.

In an exemplary use case, a machine-learning algorithm may be configured to train a machine-learning model by modifying one or more of a weight, a layer, a node, and/or a synapse of the machine-learning model such that the machine-learning model may be configured to identify patterns in database queries and query execution overhead data and output a query execution score.

In another exemplary use case, a user may input a proposed database query into a user interface. A machine-learning model may then be used to predict the execution overhead of the proposed database query without executing the proposed database query on a system. The machine-learning model may output a query execution score based on the predicted execution overhead. In a case where the query execution score exceeds a threshold, the proposed database query may be blocked from being executed on the system and/or other corrective actions may be triggered, such as generating an optimized query from the proposed database query.

In a further exemplary use case, the proposed database query, an optimized database query, and/or the execution of the optimized database query may be used to further train the machine-learning model.

While the examples above involve query optimization, it should be understood that techniques according to this disclosure may be adapted to any suitable type of optimization. It should also be understood that the examples herein are illustrative only. The techniques and technologies of this disclosure may be adapted to any suitable activity.

As used herein, and as discussed in greater detail below, "optimization" may refer to an alignment of something (e.g., a query) with best practices. For example, a machine-learning model may be trained, using one or more gathered and/or simulated sets of database queries and query execution overhead data, to identify patterns within, or to find associations between, database queries and query execution overhead data and to output a query execution score based on the same. In an example, a database query associated with a low query execution overhead (e.g., a minimal draw upon available resources) may result in a high (e.g., optimal) query execution score.

Presented below are also various aspects of machine-learning techniques that may be adapted to query optimization. As will be discussed in more detail below, machine-learning techniques adapted to query optimization, may include one or more aspects according to this disclosure, e.g., finding associations between a particular selection of training data, a particular training process for the machine-learning model, operation of a particular device suitable for use with the trained machine-learning model, operation of the machine-learning model in conjunction with particular data, modification of such particular data by the machine-learning model, etc., and/or other aspects that may be apparent to one of ordinary skill in the art based on this disclosure.

FIG. 1 depicts an exemplary environment 100 that may be utilized with techniques presented herein. One or more user device(s) 112 may communicate across an electronic network 110. As will be discussed in further detail below, one or more query optimization system(s) 102 may communicate with one or more of the other components of the environment 100 across electronic network 110. The one or more user device(s) 112 may be associated with a user, e.g., a user associated with the writing and/or running/executing of a query and/or a user associated with one or more of generating, training, or tuning a machine-learning model for query optimization. As described, the one or more user device(s) 112 may be associated with one or more users that are interacting with, or interfacing with, a database or enterprise system, by query, dashboards, alerts, lookups, and the like, via user device(s) 112.

In some embodiments, the components of the environment 100 are associated with a common entity, e.g., a financial institution, a database system, an enterprise system, an administrator of any of the same, or the like. In some embodiments, one or more of the components of the environment is associated with a different entity than another. The systems and devices of the environment 100 may communicate in any arrangement. As will be discussed herein, systems and/or devices of the environment 100 may communicate in order to one or more of generate, train, or use a machine-learning model to identify associations between database queries and query execution overhead data, and/or output a query execution score, among other activities.

The user device(s) 112 may be configured to enable a user to access and/or interact with other systems in the environment 100. For example, the user device(s) 112 may be a computer system such as, for example, a desktop computer, a mobile device, a tablet, etc. In some embodiments, the user device(s) 112 may include one or more electronic application(s), e.g., a program, interface, plugin, browser extension, etc., installed on a memory of the user device(s) 112. In some embodiments, the electronic application(s) may be associated with one or more of the other components in the environment 100. For example, the electronic application(s) may include one or more of database system software, user interface, etc.

The user device(s) 112 may include software module 114. Software module 114 may include a program, interface, plugin, browser extension, or the like. In various embodiments, query optimization system(s) 102 may be implemented or run on user device(s) 112 using software module 114. In any case, software module 114 may capture a proposed database query via an input/output interface of user device(s) 112. Software module 114 may allow the user to "submit" or "test" the proposed database query, which may trigger a transmission of the proposed database query to data capturing module 108 of query optimization system(s) 102. In examples, submitting the proposed database query via software module 114 results in the proposed database query not being executed upon a live database system, but instead may allow data capturing module 108 to capture the proposed database query, and may further allow query optimization system(s) 102 to run the proposed database query on test database 116. In an example, data capturing module 108 is configured to intercept, e.g., act as a man-in-the-middle for, a query entered by the user via the software module 114.

In various embodiments, the environment 100 may include a test database 116. In examples, test database 116 may not be associated with a live environment, or may otherwise be segregated from the live environment. The test database 116 may include a server system and/or a data storage system such as computer-readable memory such as a hard drive, flash drive, disk, etc. In some embodiments, the test database 116 includes and/or interacts with an application programming interface for exchanging data to other systems, e.g., one or more of the other components of the environment. In examples, a proposed database query may be run on test database 116 to measure or determine the resulting potential execution overhead. In such examples, the potential execution overhead may be measured without placing an actual burden upon the computing resources of a live system.

In various implementations, a second database (not illustrated) may also include and/or act as a database for query optimization system(s) 102 as a repository or source for storing database queries, execution overhead data, user profile data, query execution scores, user historical data, or any other data allowing query optimization system(s) 102 to perform or determine any aspects described herein. For example, user historical data (e.g., past database queries and query execution overhead data) may be provided from the second database as input to a machine-learning model, trained to find associations between database queries and query execution overhead data, to output a query execution score or to determine and/or trigger a corrective action.

In various embodiments, the electronic network 110 may be a wide area network ("WAN"), a local area network ("LAN"), personal area network ("PAN"), or the like. In some embodiments, electronic network 110 includes the Internet, and information and data provided between various systems occurs online. "Online" may refer to connecting to or accessing source data or information from a location remote from other devices or networks coupled to the Internet. Alternatively, "online" may refer to connecting or accessing an electronic network (wired or wireless) via a mobile communications network or device. The Internet is a worldwide system of computer networks-a network of networks in which a party at one computer or other device connected to the network can obtain information from any other computer and communicate with parties of other computers or devices. The most widely used part of the Internet is the World Wide Web (often-abbreviated "WWW" or called "the Web"). A "website page" generally encompasses a location, data store, or the like that is, for example, hosted and/or operated by a computer system so as to be accessible online, and that may include data configured to cause a program such as a web browser to perform operations such as send, receive, or process data, generate a visual display and/or an interactive interface, or the like.

As discussed in further detail below, the query optimization system(s) 102 may one or more of (i) generate, store, train, or use a machine-learning model configured to find associations between database queries and query execution overhead data, and output a query execution score. The query optimization system(s) 102 may include a machine-learning model and/or instructions associated with the machine-learning model, e.g., instructions for generating a machine-learning model, training the machine-learning model, using the machine-learning model etc. The query optimization system(s) 102 may include instructions for retrieving, monitoring, and/or capturing proposed database queries e.g., based on the output of the machine-learning model, and/or operating a display of the user device(s) 112 to provide output, e.g., as adjusted based on the machine-learning model. The query optimization system(s) 102 may include training data, e.g., database queries and query execution overhead data, and may include ground truth, e.g., training queries, to identify patterns in database queries and query execution overhead data and output a query execution score.

As depicted in FIG. 1, query optimization system(s) 102 may include corrective action module 104. In various embodiments, corrective action module 104 is configured to output, issue, trigger, or transmit a corrective action based on a query execution score. Components of query optimization system(s) 102, such as corrective action module 104, may determine that the query execution score (e.g., as output by the machine-learning model of machine-learning module 106) exceeds a query execution score threshold. In examples, and as described above, a non-optimal query may place an unnecessary burden or draw upon available computing resources, or may introduce a stability issue into the database or enterprise systems. Therefore, query optimization system 102 may capture a proposed database query (e.g., using data capturing module 108) and run it on test database 116 that is segregated from a live system. Data collected from the test run may then be input into machine-learning module 106. A machine-learning model (e.g., a query optimization machine-learning model) of machine-learning module 106 may then analyze the resulting data of the execution of the proposed database query and determine and output a query execution score. In examples, the more optimized a query may be, the higher the query execution score.

As will be described in more detail below, corrective action module 104 may then determine if the query execution score exceeds a query execution score threshold. If the query execution score exceeds the query execution score threshold, then corrective action module 104 may trigger a corrective action based on the query execution score exceeding the query execution score threshold. In various implementations, the corrective action may be transmitted via electronic network 110 to user device 112 and/or to software module 114. In examples, a history of corrective actions triggered and/or transmitted, along with associated data, may be stored in a second database, and may be retrieved and input into a machine-learning model as input data and/or as training data. Such data may also be retrieved by a system administrator and/or by an associated user.

Query optimization system(s) 102 may include machine-learning module 106. In various embodiments, machine-learning module 106 includes a machine-learning model configured to learn and identify associations between database queries and query execution overhead data to determine a query execution score for a proposed database query. The query execution score may be based upon a predicted effect (e.g., draw, cost, stability issue, or the like) that a proposed database query may have upon a database system. Previous corrective actions triggered in response to a user's proposed database queries may also be input into the machine-learning model. The machine-learning model may be trained using one or more gathered and/or simulated sets of database queries and query execution overhead data. For example, a query optimization machine-learning model may learn to associate particular types or styles of database queries with a high execution overhead. Furthermore, the query optimization machine-learning model may learn to generate and output a query execution score that is relative to a proposed database query (e.g. the higher the score, the less execution overhead). The query optimization machine-learning model may learn to associate particular patterns in query syntax and structure with greater or lesser execution overhead. In various embodiments, as these particular patterns are captured (e.g., by data capturing module 108), and are input into the query optimization machine-learning model (e.g. as a proposed database query), query optimization machine-learning model may be able to identify the particular patterns, associate them with, or predict, a potential execution overhead, and output a query execution score. In examples, the machine-learning model may be able to output a query execution score to a degree of confidence despite being provided different types of proposed database queries in different instances or cases.

As illustrated, query optimization system(s) 102 may also include data capturing module 108. In various embodiments, data capturing module 108 is configured to capture a proposed database query from user device 112. In various embodiments, software module 114 may include an application programming interface (API) to capture input (e.g., a proposed database query) and transmit the input to data capturing module 108. Data capturing module may then provide the input to any of the components of environment 100, such as machine-learning module 106.

In some embodiments, a system or device other than the query optimization system(s) 102 is used to generate and/or train the machine-learning model. For example, such a system may include instructions for generating the machine-learning model, the training data and ground truth, and/or instructions for training the machine-learning model. A resulting trained-machine-learning model may then be provided to the query optimization system(s) 102.

Generally, a machine-learning model includes a set of variables, e.g., nodes, neurons, filters, etc., that are tuned, e.g., weighted or biased, to different values via the application of training data. In supervised learning, e.g., where a ground truth is known for the training data provided, training may proceed by feeding a sample of training data into a model with variables set at initialized values, e.g., at random, based on Gaussian noise, a pre-trained model, or the like. The output may be compared with the ground truth to determine an error, which may then be back-propagated through the model to adjust the values of the variable.

Training may be conducted in any suitable manner, e.g., in batches, and may include any suitable training methodology, e.g., stochastic or non-stochastic gradient descent, gradient boosting, random forest, etc. In some embodiments, a portion of the training data may be withheld during training and/or used to validate the trained machine-learning model, e.g., compare the output of the trained model with the ground truth for that portion of the training data to evaluate an accuracy of the trained model. The training of the machine-learning model may be configured to cause the machine-learning model to learn associations between database queries and query execution overhead data, such that the trained machine-learning model is configured to identify patterns and output a query execution score based on the learned associations. As used herein, the patterns may include patterns found within the queries of one or more users, such as syntax style, frequency of running/executing queries upon a system, propensity to use one tool or application of the system over another, running time of queries, and the like.

In various embodiments, the variables of a machine-learning model may be interrelated in any suitable arrangement in order to generate the output. For example, in some embodiments, the machine-learning model may include content-processing architecture that is configured to identify, isolate, and/or extract features, geometry, and or structure in one or more of optical character recognition data and/or non-optical in vivo image data. For example, the machine-learning model may include one or more convolutional neural network ("CNN") configured to identify patterns in database queries and query execution overhead data, and may include further architecture, e.g., a connected layer, neural network, etc., configured to determine a relationship between the identified patterns in order to output a user query execution score.

In some instances, different samples of training data and/or input data may not be independent. For example, samples of training data may include database queries captured from users that elect to be monitored for the gathering of such training data, simulated database queries, simulated test runs of database queries, query execution scores, and the like. Thus, in some embodiments, the machine-learning model may be configured to account for and/or determine relationships between multiple samples, at times from multiple sources.

For example, in some embodiments, the machine-learning model of the query optimization system 102 may include a Recurrent Neural Network ("RNN"). Generally, RNNs are a class of feed-forward neural networks that may be well adapted to processing a sequence of inputs. In some embodiments, the machine-learning model may include a Long Short Term Memory ("LSTM") model and/or Sequence to Sequence ("Seq2Seq") model. An LSTM model may be configured to generate an output from a sample that takes at least some previous samples and/or outputs into account. A Seq2Seq model may be configured to, for example, receive a sequence of database queries and/or execution overhead data as input, and generate a query execution score as output.

Although depicted as separate components in FIG. 1, it should be understood that a component or portion of a component in the environment 100 may, in some embodiments, be integrated with or incorporated into one or more other components. For example, a display may be integrated into the user device 112 or the like. In another example, the query optimization system 102 may be integrated in a data storage system. The data storage system may be configured to communicate and/or receive/send data across electronic network 110 to other components of environment 100. Further, query optimization system 102 may be integrated or incorporated into software module 114. In some embodiments, operations or aspects of one or more of the components discussed above may be distributed amongst one or more other components. Any suitable arrangement and/or integration of the various systems and devices of the environment 100 may be used.

Further aspects of the machine-learning model and/or how it may be utilized are discussed in further detail in the methods below. In the following methods, various acts may be described as performed or executed by a component from FIG. 1, such as query optimization system 102, the user device 112, or components thereof. However, it should be understood that in various embodiments, various components of the environment 100 discussed above may execute instructions or perform acts including the acts discussed below. An act performed by a device may be considered to be performed by a processor, actuator, or the like associated with that device. Further, it should be understood that in various embodiments, various steps may be added, omitted, and/or rearranged in any suitable manner.

Figure 2:
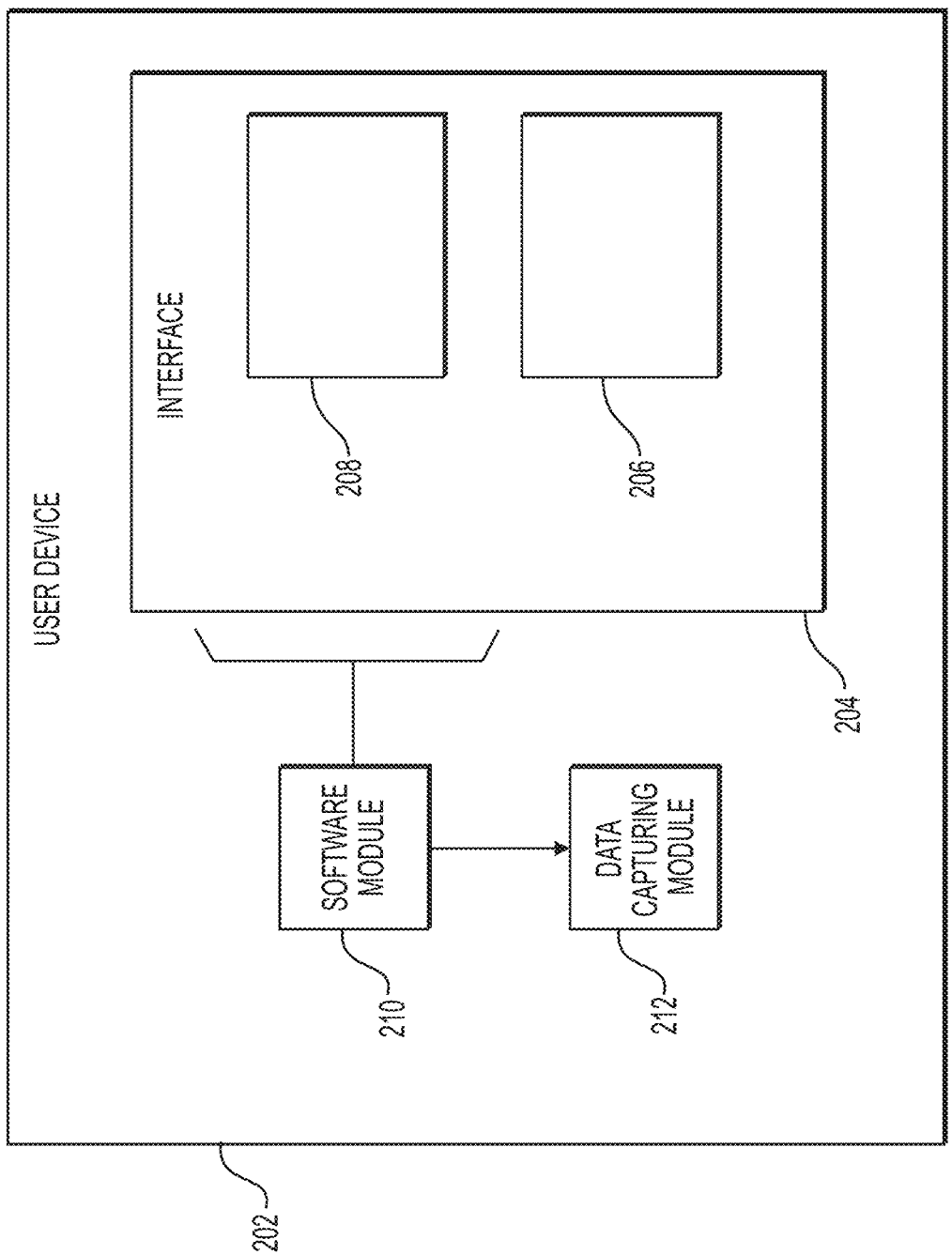
FIG. 2 depicts a block diagram of a user interface for query optimization, according to one or more embodiments.

FIG. 2 illustrates a block diagram 200 of a user interface 204 for query optimization. As illustrated, and in various embodiments, a user device 202 may include an interface 204. Interface 204 may be displayed by or within one or more displays of user device 202 and may be configured as an input/output device (e.g., I/O) or window, capable of receiving input from a user via a peripheral device attached to user device 202 (e.g., keyboard, mouse, joystick), via haptic input (e.g., touchscreen input), or the like. In examples, a user may input a proposed database query into user interface 204. As illustrated, interface 204 may include an input interface 208, within which the user may input (e.g., type) the proposed database query. User interface 204 may also include an output interface 206, as illustrated. In examples, and as will be described in further detail below, output, such as corrective actions and/or an optimized query, or the like, may be displayed within output interface 206.

As described above, with respect to FIG. 1, software module 210 (e.g., of query optimization system 102) may be configured to receive a proposed database query and to provide it to data capturing module 212. In examples, the proposed database query may be related to dashboards, alerts, lookups, and the like, and may be written as a series of commands or phrases in any sequence or arrangement according to a language or syntax. In various implementations, software module 210 may be integrated within, or executed using, user device 202, although software module 210 may also be accessed by user device 202 and not integrated within user device 202 itself. As described above, with respect to FIG. 1, data capturing module 212 (e.g., of query optimization system 102) may be configured to capture a proposed database query from input interface 208.

According to an embodiment, the proposed database query input into interface 204 via input interface 208 may be provided as input into a query optimization machine-learning model. The query optimization machine-learning model may be trained by modifying one or more weights, layers, nodes, synapses, etc., based on training data that may include historical database queries, historical execution overhead data, historical query execution scores, simulated database queries, simulated execution overhead data, simulated query execution scores, and/or the like. The training data may be tagged or untagged (e.g., for supervised, semi-supervised, or unsupervised training). The query optimization machine-learning model may generate an output including the query execution score determined based on the input proposed database query. Alternatively, or in addition, the query optimization machine-learning model may output a query optimization confidence score, where the query optimization confidence score indicates a level of confidence that an output query execution score represents, or truly predicts, an execution overhead of the proposed query. The query execution score may be determined based on the respective query optimization confidence score meeting a query optimization confidence score threshold.

Figure 3:
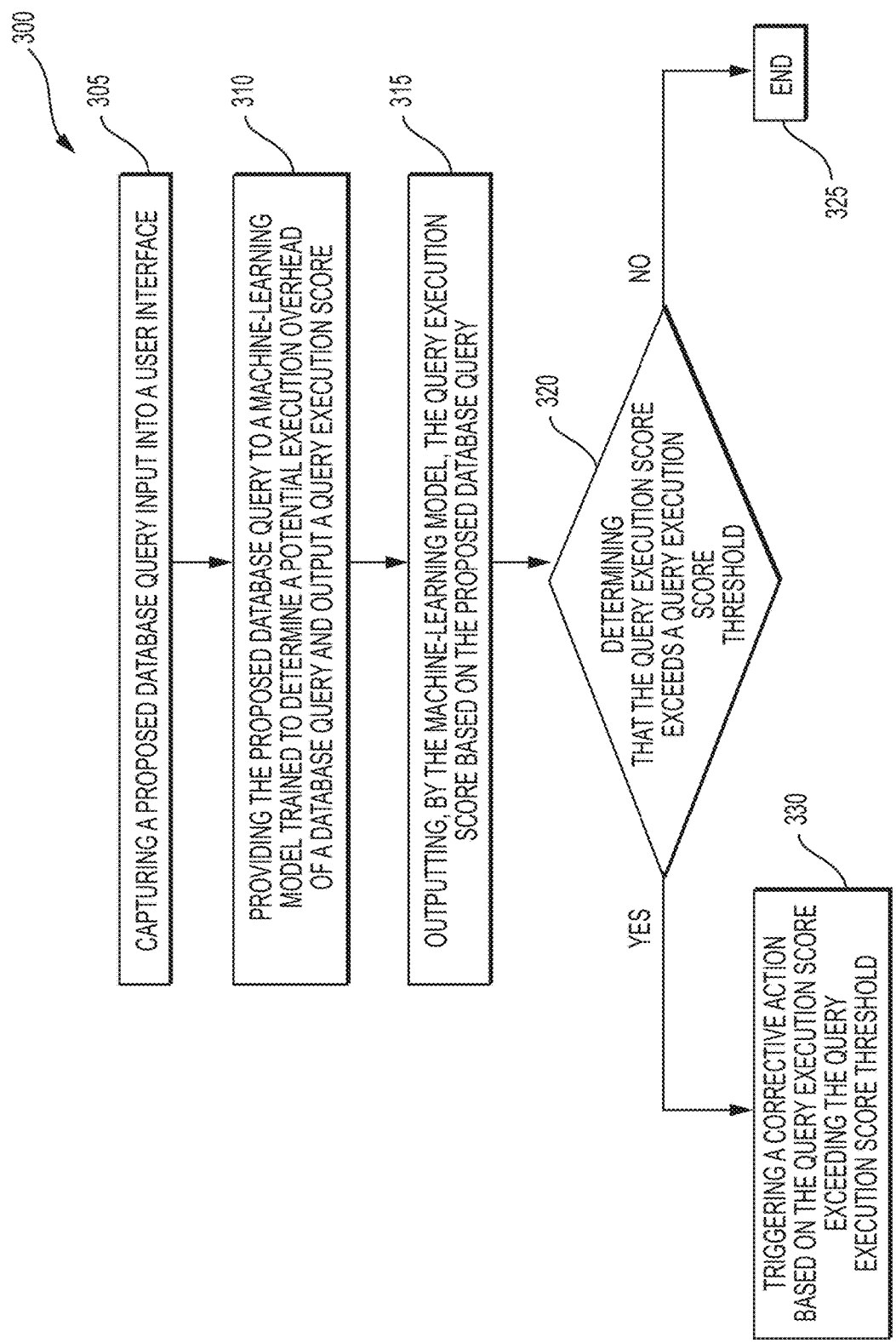
FIG. 3 depicts a flowchart of an exemplary method of query optimization, according to one or more embodiments.

FIG. 3 illustrates an exemplary method 300 of query optimization, such as in the various examples discussed herein. At step 305, a proposed database query input into a user interface may be captured (e.g., such as by data capturing module 108, as depicted in FIG. 1). In examples, data associated with a unique user that input the proposed database query into the user interface may be recorded. The data may include a username, user profile data, user access level, user historical data, and the like. At step 310, the proposed database query may be provided to a machine-learning model. As described above, the machine-learning model may have been trained, using any one of the mechanisms described herein, to determine a potential execution overhead of the potential database query and to output a query execution score. The potential execution overhead may include or relate to a predicted query workload placed upon a database system. The query workload may represent a draw upon the computing resources of a system. In examples, the proposed database query may be provided to a machine-learning module that implements the machine-learning model (e.g., machine-learning module 106, as depicted in FIG. 1). At step 315, the query execution score may be output based on the proposed database query. In various implementations, an execution overhead resulting from executing the proposed database query may be obtained and the query optimization machine-learning model may be retrained using the proposed database query and the execution overhead.

At step 320, it may be determined whether or not the query execution score exceeds a query execution score threshold. In examples, the query execution score threshold may represent a boundary that disqualifies the query for access to the live environment. The query execution score threshold may be fixed or it may be variable, based upon current traffic or workload on a database system, based upon a particular user, based upon an average overhead of queries received over a period of time, or the like. If the query execution score does not exceed the query execution score threshold, then, at step 325, exemplary process 300 ends. In examples, if the query execution score does not exceed the query execution score threshold, then the proposed database query may be run, or may be qualified to be run, in the live environment. If the query execution score does exceed the query execution score threshold, at step 330, a corrective action may be triggered based on the query execution score exceeding the query execution score threshold. In examples, a corrective action may include blocking the proposed database query from being executed on a database.

Figure 4A:
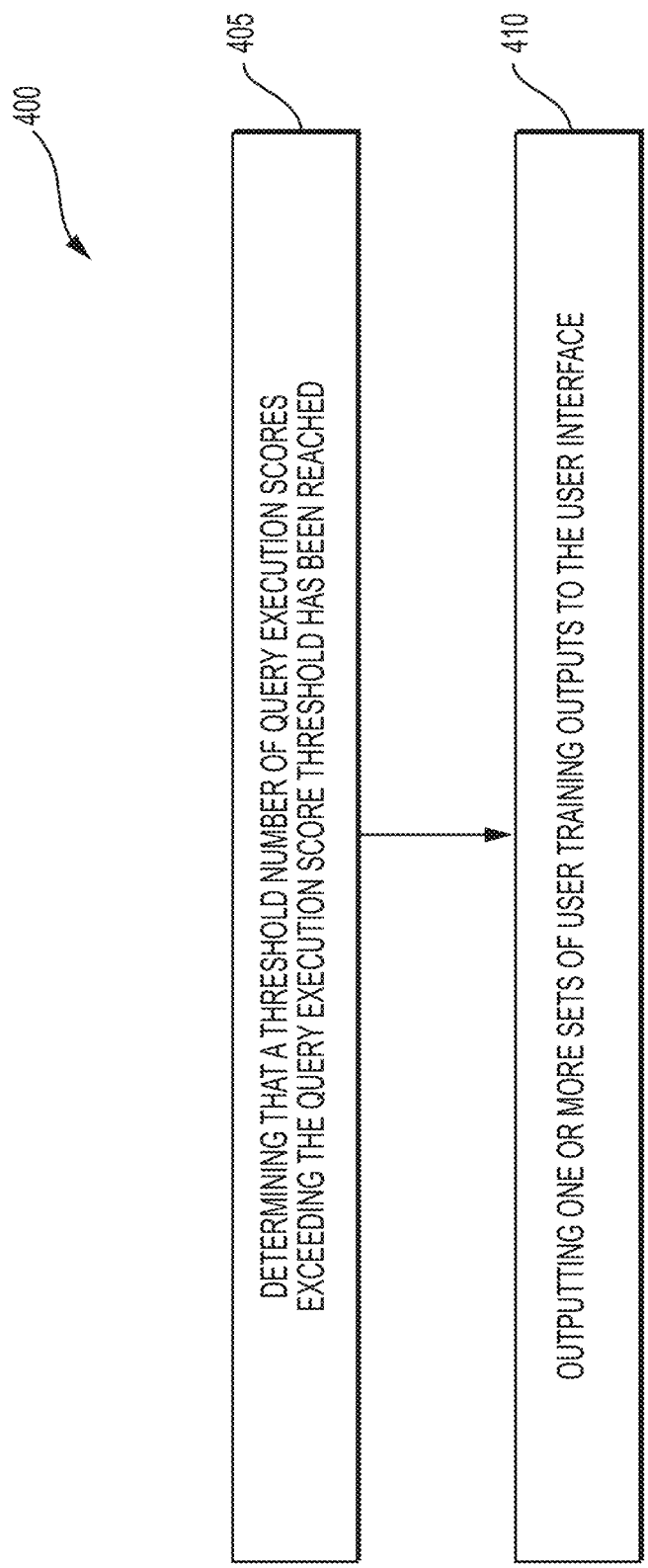
FIG. 4A depicts a flowchart of an exemplary method of triggering a first corrective action, according to one or more embodiments.

FIG. 4A illustrates an exemplary method 400 for triggering a first corrective action, according to one or more embodiments discussed above, such as those discussed with respect to FIG. 1. At step 405, it may be determined that a threshold number of query execution scores exceeding the query execution score threshold has been reached. In examples, such a circumstance may indicate that a particular user has chronically written non-optimal queries, or that a particular grouping of proposed queries are non-optimal. At step 410, one or more sets of user training outputs may be output to the user interface (e.g., user interface 204, as depicted in FIG. 2). The execution of further queries may be blocked or suspended until an indication that the training is complete is received. In examples, user training outputs may include training manuals . . . .

Figure 4B:
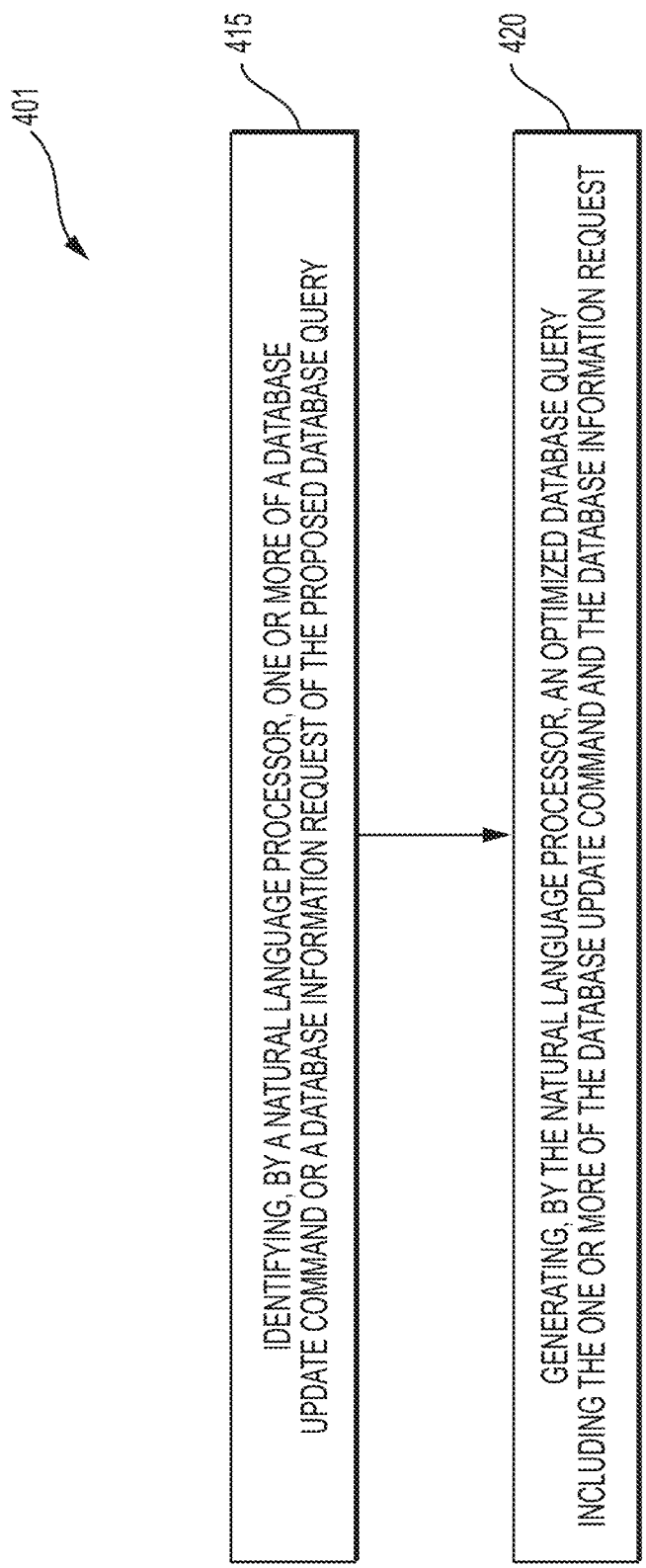
FIG. 4B depicts a flowchart of an exemplary method of triggering a second corrective action, according to one or more embodiments.

FIG. 4B illustrates an exemplary method 401 for triggering a second corrective action, according to one or more embodiments discussed above, such as those discussed with respect to FIG. 1. At step 415, one or more of a database update command or a database information request of the proposed database query may be identified by a natural language processor. In examples, each statement of the proposed database query may be parsed using the natural language processor. The natural language processor may be implemented by the query optimization system (such as query optimization system 102, as depicted in FIG. 1), or by a software module (such as software module 114, as depicted in FIG. 1), or the like. At step 420, an optimized database query including the one or more of the database update command and the database information request may be generated by the natural language processor. In examples, the natural language processor may restructure the parsed query statements according to a set of syntax rules. The syntax rules may reflect query best practices. Therefore, the optimized database query may include all of the same effective commands and/or requests, but may be optimally formatted. For example, a search on the database may be narrowed by adding a specified index, source, and/or host to the proposed database query, costly operators such as "NOT" may be replaced with more optimal ones such as "AND", or query results may be filtered before calculations are performed, or the like. The optimized database query may result in a lower execution overhead than would the proposed database query.

Figure 5:
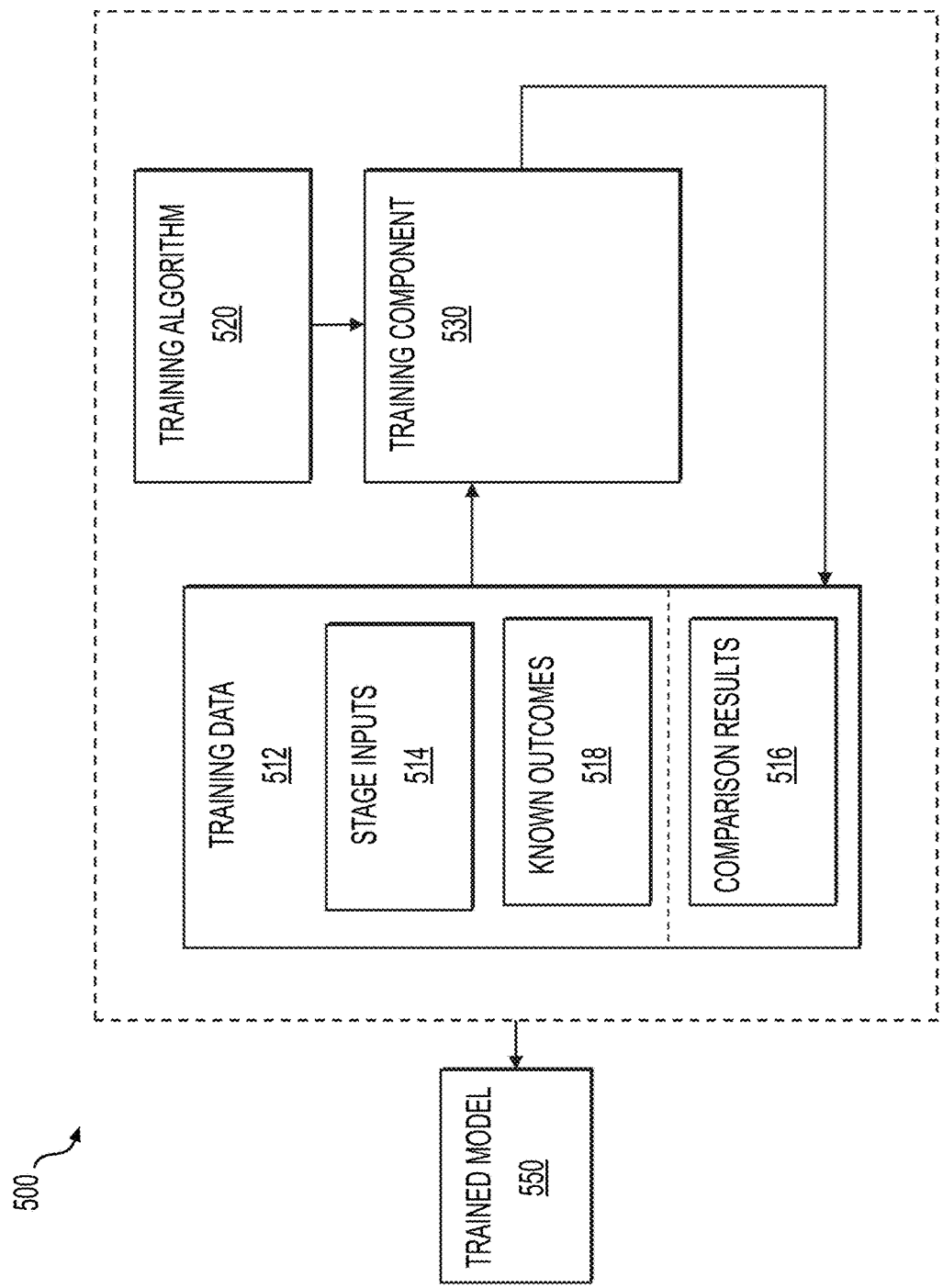
FIG. 5 depicts a flow diagram for training a machine-learning model, according to one or more embodiments.

As disclosed herein, one or more implementations disclosed herein may be applied by using a machine-learning model. A machine-learning model as disclosed herein may be trained using one or more components or steps of FIGS. 1-4B. As shown in flow diagram 500 of FIG. 5, training data 512 may include one or more of stage inputs 514 and known outcomes 518 related to a machine-learning model to be trained. The stage inputs 514 may be from any applicable source including a component or set shown in the figures provided herein. The known outcomes 518 may be included for machine-learning models generated based on supervised or semi-supervised training. An unsupervised machine-learning model might not be trained using known outcomes 518. Known outcomes 518 may include known or desired outputs for future inputs similar to or in the same category as stage inputs 514 that do not have corresponding known outputs.

The training data 512 and a training algorithm 520 may be provided to a training component 530 that may apply the training data 512 to the training algorithm 520 to generate a trained machine-learning model 550. According to an implementation, the training component 530 may be provided comparison results 516 that compare a previous output of the corresponding machine-learning model to apply the previous result to re-train the machine-learning model. The comparison results 516 may be used by the training component 530 to update the corresponding machine-learning model. The training algorithm 520 may utilize machine-learning networks and/or models including, but not limited to a deep learning network such as Deep Neural Networks (DNN), Convolutional Neural Networks (CNN), Fully Convolutional Networks (FCN) and Recurrent Neural Networks (RCN), probabilistic models such as Bayesian Networks and Graphical Models, and/or discriminative models such as Decision Forests and maximum margin methods, or the like. The output of the flow diagram 500 may be a trained machine-learning model 550.

A machine-learning model disclosed herein may be trained by adjusting one or more weights, layers, and/or biases during a training phase. During the training phase, historical or simulated data may be provided as inputs to the model. The model may adjust one or more of its weights, layers, and/or biases based on such historical or simulated information. The adjusted weights, layers, and/or biases may be configured in a production version of the machine-learning model (e.g., a trained model) based on the training. Once trained, the machine-learning model may output machine-learning model outputs in accordance with the subject matter disclosed herein. According to an implementation, one or more machine-learning models disclosed herein may continuously update based on feedback associated with use or implementation of the machine-learning model outputs.

It should be understood that embodiments in this disclosure are exemplary only, and that other embodiments may include various combinations of features from other embodiments, as well as additional or fewer features. For example, while some of the embodiments above pertain to multipartite relay, any suitable activity may be used.

In general, any process or operation discussed in this disclosure that is understood to be computer-implementable, such as the processes illustrated in the flowcharts disclosed herein, may be performed by one or more processors of a computer system, such as any of the systems or devices in the exemplary environments disclosed herein, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices, such as one or more of the systems or devices disclosed herein. One or more processors of a computer system may be included in a single computing device or distributed among a plurality of computing devices. A memory of the computer system may include the respective memory of each computing device of the plurality of computing devices.

FIG. 6 is a simplified functional block diagram of a computer 600 that may be configured as a device for executing the methods disclosed here, according to exemplary embodiments of the present disclosure. For example, the computer 600 may be configured as a system according to exemplary embodiments of this disclosure. In various embodiments, any of the systems herein may be a computer 600 including, for example, a data communication interface 620 for packet data communication. The computer 600 also may include a central processing unit ("CPU") 602, in the form of one or more processors, for executing program instructions. The computer 600 may include an internal communication bus 608, and a storage unit 606 (such as ROM, HDD, SDD, etc.) that may store data on a computer readable medium 622, although the computer 600 may receive programming and data via network communications. The computer 600 may also have a memory 604 (such as RAM) storing instructions 624 for executing techniques presented herein, although the instructions 624 may be stored temporarily or permanently within other modules of computer 600 (e.g., processor 602 and/or computer readable medium 622). The computer 600 also may include input and output ports 612 and/or a display 610 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the disclosed methods, devices, and systems are described with exemplary reference to transmitting data, it should be appreciated that the disclosed embodiments may be applicable to any environment, such as a desktop or laptop computer, an automobile entertainment system, a home entertainment system, etc. Also, the disclosed embodiments may be applicable to any type of Internet protocol.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method comprising:
receiving, by one or more processors, a proposed database query input into a user interface;
providing, by the one or more processors, the proposed database query to a machine-learning model, wherein the machine-learning model has been trained, using one or more sets of query execution overhead data and one or more sets of database queries, to determine a potential execution overhead of a database query and output a query execution score;
outputting, by the machine-learning model, the query execution score based on the proposed database query;
determining, by the one or more processors, that the query execution score exceeds a query execution score threshold; and
based on determining that the query execution score exceeds the query execution score threshold, generating, by the one or more processors, an optimized query from the proposed database query, wherein the optimized query has a lower execution overhead than the proposed database query.

2. The computer-implemented method of claim 1, further comprising:
obtaining an execution overhead resulting from executing the proposed database query; and
retraining the machine-learning model using the proposed database query and the execution overhead.

3. The computer-implemented method of claim 1, wherein the potential execution overhead comprises a predicted query workload placed upon a database system.

4. The computer-implemented method of claim 1, further comprising:
blocking, by the one or more processors, the proposed database query from being executed on a database.

5. The computer-implemented method of claim 1, wherein the generating the optimized query comprises:
identifying, by a natural language processor, one or more of a database update command or a database information request of the proposed database query; and
generating, by the natural language processor, an optimized database query including the one or more of the database update command and the database information request.

6. The computer-implemented method of claim 1, wherein the generating the optimized query comprises:
determining, by the one or more processors, that a threshold number of query execution scores exceeding the query execution score threshold has been reached; and
outputting, by the one or more processors, one or more sets of user training outputs to the user interface.

7. The computer-implemented method of claim 1, further comprising:
recording, by the one or more processors, data associated with a unique user that input the proposed database query into the user interface.

8. A computer-implemented method comprising:
providing, by one or more processors, a proposed database query to a machine-learning model, wherein the machine-learning model has been trained, using one or more sets of query execution overhead data and one or more sets of database queries, to determine a potential execution overhead of a database query and output a query execution score;
outputting, by the machine-learning model, the query execution score based on the proposed database query;
determining, by the one or more processors, that the query execution score exceeds a query execution score threshold;
identifying, by a natural language processor, one or more formats of the proposed database query for restructuring; and
generating, by the natural language processor, an optimized database query including the one or more restructured formats.

9. The computer-implemented method of claim 8, wherein the generating the optimized database query further comprises:
restructuring query statements according to a set of syntax rules.

10. The computer-implemented method of claim 8, wherein the generating the optimized database query further comprises:
reformatting the proposed database query.

11. The computer-implemented method of claim 8, wherein the machine-learning model has been trained further on a history of triggered corrective actions.

12. The computer-implemented method of claim 8, further comprising:

determining, by the one or more processors, that a threshold number of query execution scores exceeding the query execution score threshold has been reached; and
outputting, by the one or more processors, one or more sets of user training outputs to a user interface.

13. A system comprising:
a memory storing instructions and a machine-learning model that has been trained to find associations between one or more sets of query execution overhead data and one or more sets of database queries to determine a potential execution overhead of a database query and output a query execution score; and
a processor operatively connected to the memory and configured to execute the instructions to perform operations including:
receiving, by one or more processors, a proposed database query input into a user interface;
providing, by the one or more processors, the proposed database query to the machine-learning model;
outputting, by the machine-learning model, the query execution score based on the proposed database query;
determining, by the one or more processors, that the query execution score exceeds a query execution score threshold; and
based on determining that the query execution score exceeds the query execution score threshold, generating, by the one or more processors, an optimized query from the proposed database query, wherein the optimized query has in a lower execution overhead than the proposed database query.

14. The system of claim 13, the operations further comprising:
obtaining an execution overhead resulting from executing the proposed database query; and
retraining the machine-learning model using the proposed database query and the execution overhead.

15. The system of claim 13, wherein the potential execution overhead comprises a predicted query workload placed upon a database system.

16. The system of claim 13, wherein the query execution score is further based on a user of the proposed database query.

17. The system of claim 13, wherein the query execution score threshold is based on current traffic or workload on a database system.

18. The system of claim 17, wherein the generating the optimized query comprises:
identifying, by a natural language processor, one or more of a database update command or a database information request of the proposed database query; and
generating, by the natural language processor, an optimized database query including the one or more of the database update command and the database information request.

19. The system of claim 13, wherein the generating the optimized query comprises:
determining, by the processor, that a threshold number of query execution scores exceeding the query execution score threshold has been reached; and
outputting, by the processor, one or more sets of user training outputs to the user interface.

20. The system of claim 13, wherein the machine-learning model has been further trained on user historical data.

* * * * *